Oct. 16, 1945. D. PARRETT 2,387,039
MULTIPLE DISK BRAKE
Filed Nov. 28, 1944 4 Sheets-Sheet 1

Inventor
Dent Parrett
By Robb & Robb
His Attorneys

Oct. 16, 1945.  D. PARRETT  2,387,039
MULTIPLE DISK BRAKE
Filed Nov. 28, 1944  4 Sheets-Sheet 2

Inventor
Dent Parrett
By Robb & Robb
His Attorneys

Oct. 16, 1945.　　　D. PARRETT　　　2,387,039
MULTIPLE DISK BRAKE
Filed Nov. 28, 1944　　　4 Sheets-Sheet 3
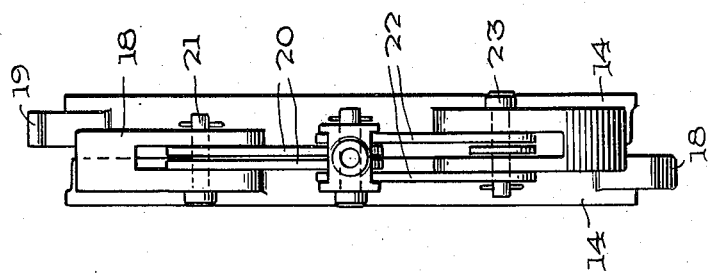
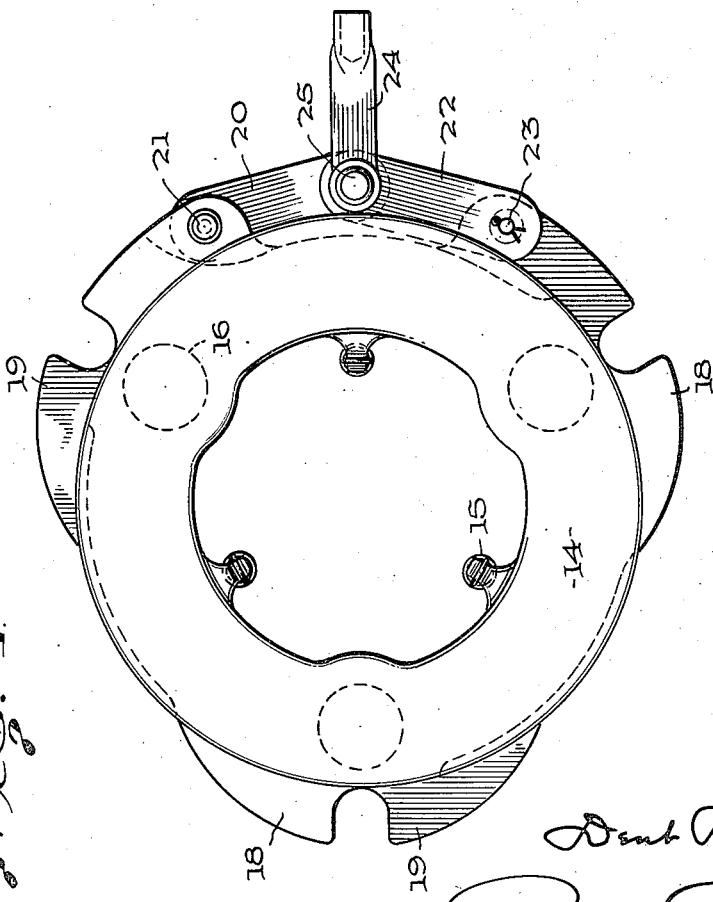

Oct. 16, 1945.   D. PARRETT   2,387,039
MULTIPLE DISK BRAKE
Filed Nov. 28, 1944   4 Sheets-Sheet 4
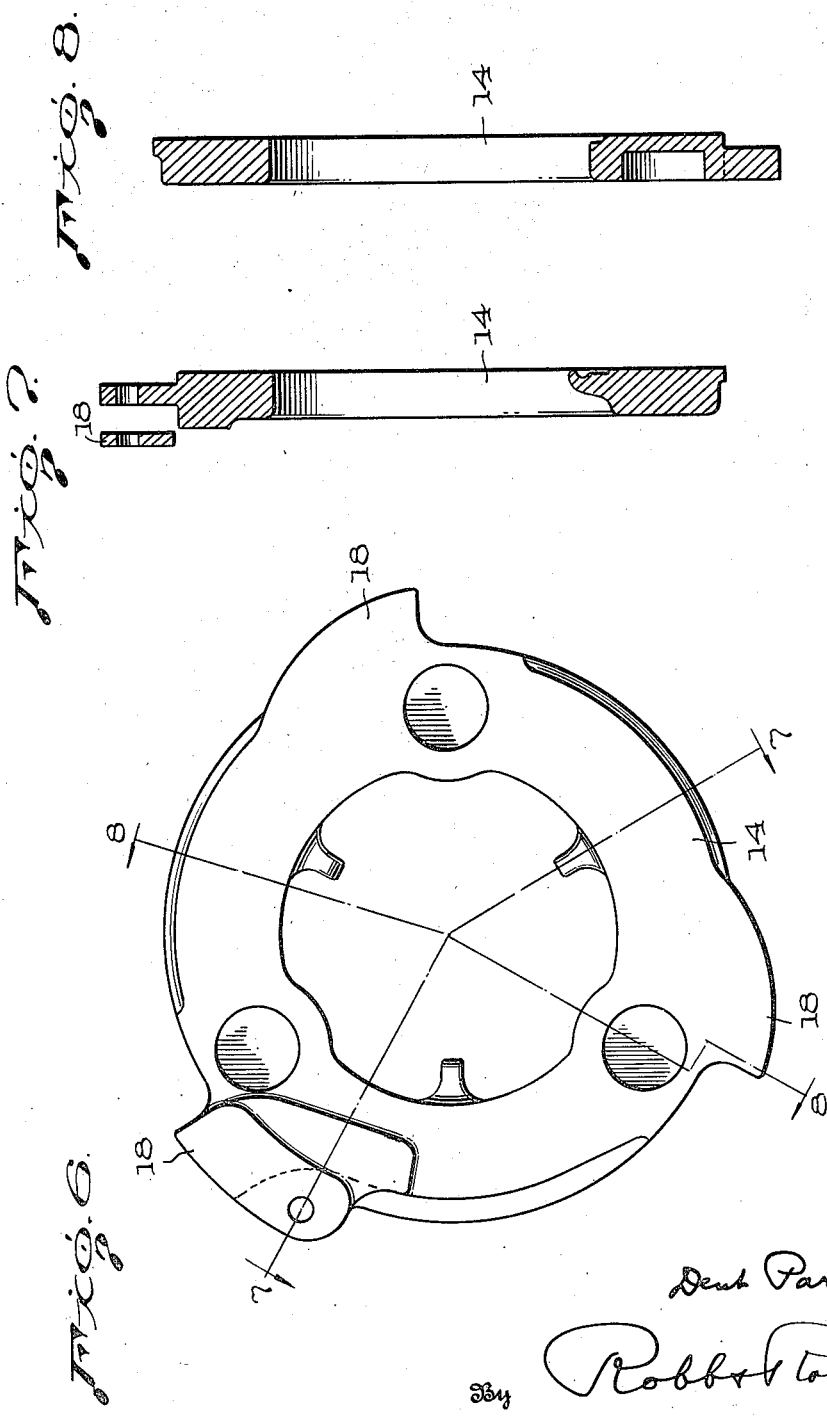

Patented Oct. 16, 1945

2,387,039

UNITED STATES PATENT OFFICE 2,387,039

MULTIPLE DISK BRAKE

Dent Parrett, St. Joseph, Mich., assignor, by mesne assignments, to Lambert Brake Corporation, St. Joseph, Mich., a corporation of Michigan Application November 28, 1944, Serial No. 565,472

10 Claims. (Cl. 188—72)

The present invention relates to improvements in brake apparatus, particularly of the disk type, and it has for its primary object the provision of a simple construction that may be manufactured comparatively cheaply and yet provide a powerful brake which is equally and uniformly effective in either direction of movement of the part to be braked.

It is to be understood that the principles of construction and operation of this brake may be applied to or utilized in any mechanism where a quick and powerful braking action is desired, but for the purposes of exemplification, the brake is herein illustrated as an embodiment suitable for tractors, airplanes, automobiles, buses and similar vehicular constructions.

Characteristic of its novelty, is the provision of elemental features or parts which are duplicative and therefore interchangeable in usage or replacement and by means of which a multiple disk brake is obtained having a maximum friction surface area that contributes materially to effectiveness of uniform braking action in either direction of movement of the vehicle.

In carrying out the objectives of this invention, I employ a relatively stationary actuating unit disposed between rotary braking disks, said central unit being composed of complemental slightly rotatable disks having camming means therebetween for separating the complemental disks when one or the other of said disks is stopped against rotary movement by limit abutments as stress is applied to the said disks tending to rotate the same, said separating or expanding action of the center unit referred to causing braking or retarding action of the rotary disks. The braking action referred to is an energizing or servo-operation produced by camming surfaces and coacting rolling members added to the stress of the initiating power actuator, and the particular disk of the actuating unit which renders the braking operation effective is determined by the direction of rotation of the rotary disks or the driving shaft to which they are connected, all as will be more specifically set forth hereinafter.

In the drawings:

Figure 3 is an enlarged fragmentary sectional view on the line 3—3 of Figure 1;

Figure 4 is a view in elevation of the center actuator unit alone;

Figure 5 is a view in end elevation of the actuator unit, showing more clearly the linkage connections to its disks;

Figure 6 is a side elevation of one of the actuator unit disks; and

Figure 1:
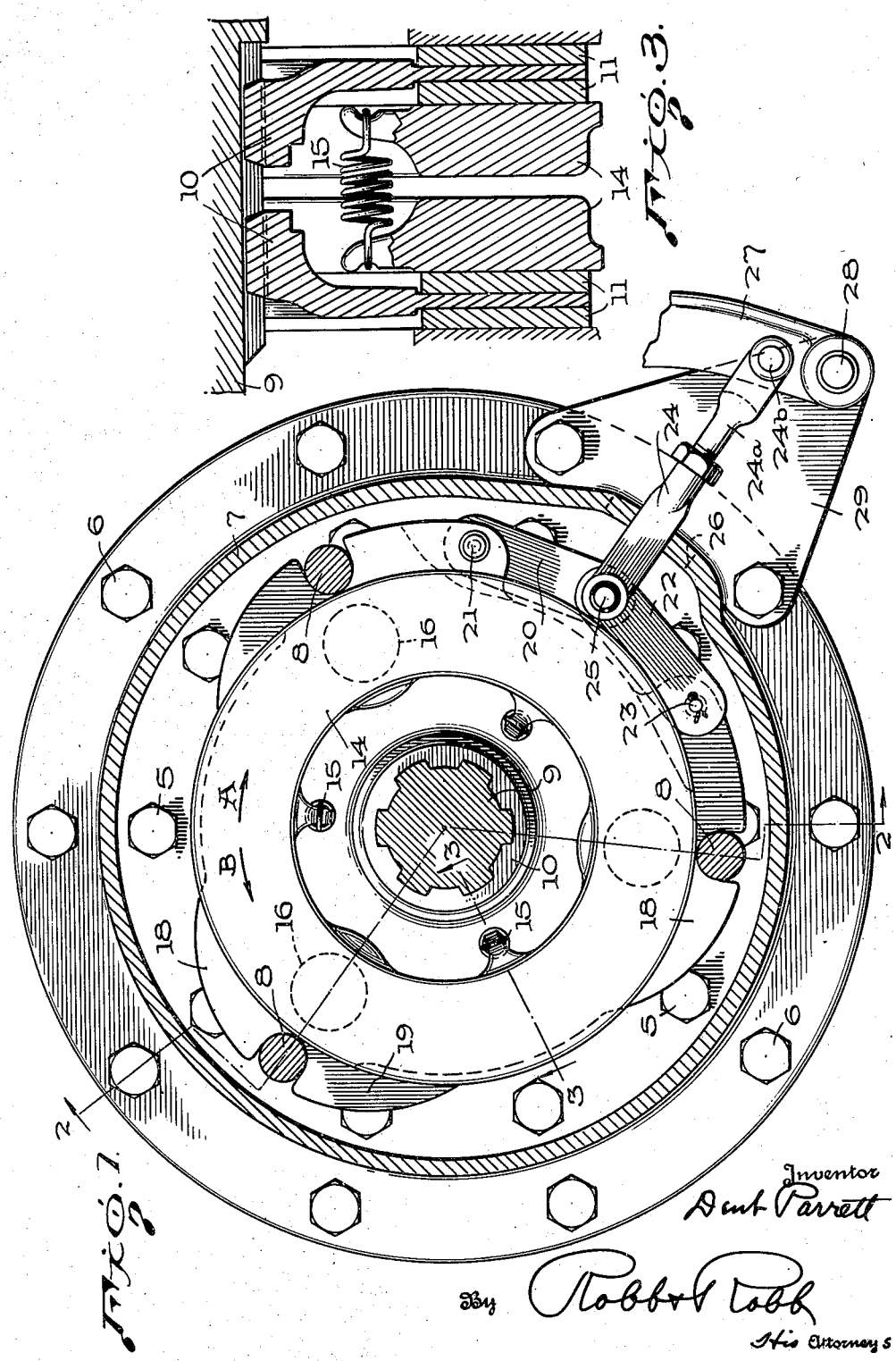
Figure 1 is a sectional view through a brake construction embodying my invention, taken about on the plane indicated by the line 1—1 of Figure 2.
Figure 2:
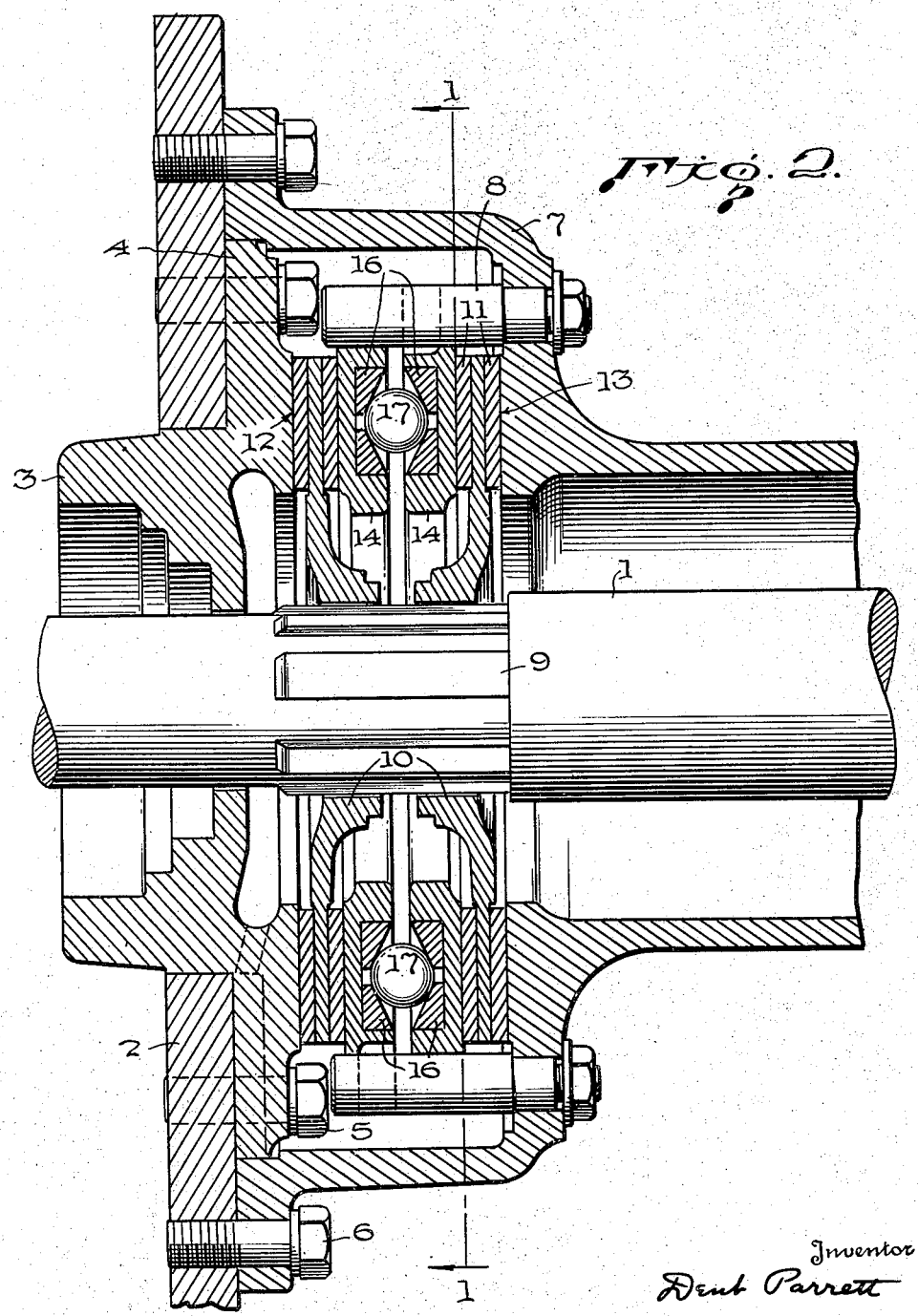
Figure 2 is a sectional view taken on the plane indicated by the line 2—2 of Figure 1.

Figures 7 and 8 are transverse sectional views on the lines 7—7 and 8—8, respectively, of Figure 6.

Like reference characters designate corresponding parts in the several figures of the drawings.

The construction of brake mechanism herein illustrated, as hereinbefore premised, is designed for application to a conventional type of tractor, speaking more particularly as regards the general supporting structure and casing enclosure, and it will, therefore, be understood that I do not wish to be restricted to the particular mounting of the brake mechanism now to be described.

The numeral 1 designates a drive shaft which may be the driving shaft of an automobile, or a tractor axle, or a jack or like shaft of a transmission or any driven member which is required to be retarded or braked in its movement by the action of the mechanism forming the subject matter of this invention. The supporting plate 2 may be a side plate of a transmission housing or any other similar support and carries a hub member 3 having a bearing opening for the shaft 1. The flange 4 of this hub is attached to the plate 2 by means of a series of bolts 5.

To one side of the plate 2 is secured, by means of the bolts 6, the axle housing or casing to generally enclose the brake mechanism of this invention. Mounted in the casing so as to extend inwardly thereof are studs 8, there being in this instance three of such studs arranged at predetermined radii and about 120° apart, these studs constituting abutments for certain elements of the brake mechanism.

Upon the splined section 9 of the shaft 1 are axially shiftable rotary disks 10, 10, each of which has attached thereto at opposite sides the friction linings 11, each such rotary disk being a counterpart of the other so that they may be interchangeable in disposition upon the shaft and economically manufactured in identically the same way. One of these disks 10 is arranged adjacent the machined friction surface 12 on the inner face of the hub 3, and the other of said disks is similarly disposed relative to the friction surface 13 on the inner face of the casing 7, there being sufficient clearance between the respective friction surfaces at all times of release of braking action.

Between the two rotary disks 10 is mounted what I term for the purposes of this description a relatively stationary actuator unit which is composed of the complementary rings or discs 14, 14, also identical in construction and interchangeable, the connecting springs 15 arranged at intervals around their inner peripheries tending to hold the parts in their normal position with brake in release position, and to return the relatively movable parts to such position after a brake application, and the intermediate camming inserts with ball or roller elements. The inserts designated 16, are arranged in pairs at intervals and have inclined surfaces to cooperate with balls or rollers 17 as well known in the art of disk brakes of the so-called energizing type. Each of the disks 14 has formed on its periphery a series of lugs, those on one disk being designated 18, and those on the other 19, for the sake of convenience. The acting end face of each lug is preferably curved on an arc conforming to the surface of the stud with which it coacts and there are as many lugs on each disc as there are studs, but it will be observed by reference to Figure 1 that one disk is reversely disposed with reference to the other, so that in functioning as hereinafter explained, one set of lugs is adapted to abut the studs at one side, while the other set is adapted to abut the said studs at the other side.

It will be apparent that each disk is prevented from turning, except in one direction, by the studs, and when they are assembled in operative relation, one disk will rotate slightly in a clockwise direction as shown by the arrow A, and the other in a counter-clockwise direction shown by the arrow B, depending upon the movement of the vehicle forwardly or rearwardly, as the case may be.

The actuating means for setting up braking action may be of various types, pneumatic, hydraulic, or purely mechanical, and I do not wish to be restricted in this respect, but for the purpose of this disclosure, I have illustrated a simple mechanical type composed of links 20 connected to the pin 21 projecting oppositely from the end of a lug 18 of one disk, and links 22 connected to the pin 23 of a lug 19 of the other disk, and a clevis 24, 24a connected to said links by the pin 25. The clevis extends through an opening 26 in the casing 7, and is in turn connected by a pull rod (not shown) to a pedal or lever. Or, as shown, the clevis may be connected directly to the pedal 27 pivotally secured at 28 to the bracket plate 29 in turn secured beneath the adjacent casing bolts 6.

When the clevis is pulled, the disks 14, 14 of the actuator unit are moved relative to one another, thereby causing the rolling members 17 to climb the insert camming surfaces which effects a spreading of the disks 14 against the tension of the springs 15, said disks in turn contacting with the rotary disks 10, 10, shifting them axially on the shaft against the friction surfaces 12 and 13 to produce braking action. When the foregoing operation takes place, it will be apparent that the actuator unit due to the frictional engagement tends to turn slightly in the direction of rotation of the disks 10, 10. Thus, if the disks 10 are turning in a clockwise direction, as shown in Figure 1 by arrow A, the unit will likewise turn in said direction until the lugs 19 of one disk abut against the studs 8. This disk then acts as a power or backing plate and the companion disk continues its slight turning movement in a clockwise direction and furnishes the energizing or power build up, assisted by the additional pulling effect of the pull rod or pedal.

If the rotary disks 10, 10 are rotating in a counter-clockwise direction, as shown by arrow B, the actuator unit will turn likewise until the lugs 18 of one disk abut the studs 8, whereupon this disk becomes the power plate and the other disk continues to rotate, thereby setting up the energizing or power action, assisted by the pull of the pull rod. The clearance between the acting faces of the lugs 18 and 19 is not large, being rather in the nature of a tolerance setting so that there is little, if any, noise created by impingement with the studs.

By way of summary, it may be stated that the actuator unit with its roller or ball insert assemblies serve a three-fold purpose. First, they serve as an actuating means to spread the two slightly rotatable disks 14, 14, until contact is made with the rotary rings or disks 10, 10, thereby initiating braking action. Secondly, this center unit functions as a power unit to provide energization or auxiliary power incident to the rolling of the rolling members 17 up the inclines of the inserts from the time of the frictional engagement of the disks 14 with the disks 10. Thirdly, by the adjustment of the length of the pull rod clevis, the inserts provide a means for adjustment of the braking surfaces relative to each other and maintenance of them in parallel relation to each other.

It will be apparent from the foregoing description that this invention presents important advantages in that it provides a given braking capacity within a smaller space, thus reducing the general dimensions of the surrounding parts. It is very simple in construction, being composed primarily of the two rotary disks or rings which are identical and two actuating disks which are identical, the disks of each such pairs being assembled in reverse positions relative to each other. Further, the adjustments of the brake may be made from the outside of the enclosing casing, such as by reducing the length of the pull rod clevis connection by adjustment of the clevis parts 24 and 24a, which in turn actuates the disks sufficiently to allow the proper amount of clearance between the rotary disks and the rest of the actuator unit assembly.

More specifically, by the arrangement of this invention, the diameter of the conventional brake in use today may be reduced practically one-third, and in consequence it will involve less weight, less cost of manufacture, and less heavy parts, such as axle and gear housings. The brake, furthermore, will be much easier to assemble.

I claim:

1. Brake mechanism of the class described, comprising in combination, a drive shaft, rotary disks slidably connected to said shaft, an actuator unit, a brake casing in which said rotary disks and actuator unit are mounted, having opposed spaced friction surfaces and supporting means for holding the unit in cooperative relation to the rotary disks, said unit comprising a pair of disks disposed between the spaced friction surfaces of the casing aforesaid and camming means between said pair of disks for spreading said disks apart to effect frictional engagement of said disks with the rotary disks in brake application, and means for shifting the actuator unit disks relative to each other to initiate the spreading action thereof and movement of the rotary disks into braking engagement with the friction surfaces of the casing.

2. Brake mechanism of the class described, comprising in combination, a drive shaft, rotary disks slidably connected to said shaft in spaced relation, an actuator unit, a brake casing having opposed braking surfaces in which said rotary disks and actuator unit are mounted, including supporting means for holding the unit in cooperative relation to the rotary disks, said unit comprising a pair of disks and camming means therebetween for spreading said disks apart to effect frictional engagement of said disks with the rotary disks in brake application, and means for shifting the actuator unit disks relative to each other to initiate the spreading action thereof and movement of said rotary disks into engagement with the casing surfaces aforesaid, said frictionally engaging disks of the actuator unit being slightly rotatable by the rotary disk to effect increase of the spreading action of the actuator disks and greater braking application on the rotary disks.

3. In brake apparatus of the class described, the combination of a brake housing having braking surfaces at opposite sides thereof, a pair of rotary disks mounted therein and axially movable into frictional engagement with said surfaces to produce braking action of said rotary disks, an actuator unit mounted in said housing between the rotary disks and composed of a pair of disks and camming means therebetween for spreading the actuator unit disks apart, means for shifting said last-mentioned disks relative to each other to initiate the spreading action and frictional engagement thereof with the rotary disks, and stop means coacting with said actuator unit disks for holding one of said disks stationary while the other of said disks is slightly rotated by its coacting rotary disk to produce further spreading action of the actuator unit by the camming means and increased braking action upon the rotary disks.

4. Brake mechanism as set forth in claim 3, wherein the actuator unit includes means normally tensioning its disks against spreading action and operable to return said disks to initial position upon brake release operation.

5. Brake apparatus as set forth in claim 3, wherein the actuator unit disks are provided with extensions engageable with the stop means to support the actuator unit in the brake housing, said extensions being so arranged relative to the stop means as to permit one of the actuator disks to shift rotatably relative to the other upon engagement with the rotary disks.

6. In brake mechanism of the class described, the combination of a drive shaft, a pair of rotary disks splined to said shaft in spaced relation, a housing surrounding the shaft and having frictional surfaces engageable by the respective rotary disks upon axial movement thereof, an actuator unit mounted between the rotary disks and comprising a pair of disks, complemental camming inserts and rollable members carried by said last-mentioned disks and arranged therebetween for effecting spreading action of said disks and frictional engagement thereof with the rotary disks, each of said actuator unit disks having peripheral lugs, those of one disk being arranged in opposed relation to the lugs of the other disk, stop means projecting inwardly of the housing so as to be engaged at one side by the lugs of one disk and at the opposite side by the lugs of the other disk, and means connected to the respective actuator unit disks to cause the lugs of one disk to abut with the stop means aforesaid and slight rotation of the other of said disks to thereby effect initial spreading of the actuator disks by the rollable members into frictional engagement with the rotary disks, said slightly rotatable actuator unit disk being further rotatable by the frictional engagement to increase the frictional engagement of the respective disks in brake application.

7. Brake apparatus as set forth in claim 6, wherein the means connected to the actuator unit disks for effecting initial spreading action thereof consists of a pull member and links.

8. Brake apparatus as set forth in claim 6, wherein the actuator unit includes springs connecting the disks thereof to normally tension the disks toward each other and to restore said disks after brake application to their original unexpanded position.

9. In a brake apparatus of the class described, the combination of a drive shaft; a pair of rotary disks splined to said shaft, in spaced relation to each other; a housing surrounding the shaft and disks and having frictional surfaces engageable by the respective rotary disks upon axial movement thereof; an actuator unit mounted in said housing between the rotary disks and comprising a pair of rotatable friction disks engageable with the rotary disks in either direction of rotation thereof to produce equal braking action of the shaft in either direction, and means for expanding or spreading said friction disks; stop means coacting with said friction disks of the actuator unit to hold one of said actuator unit disks stationary and permit rotation of the other in one direction of rotation of the rotary disks and upon reverse rotation of the rotary disks to hold the actuator unit disk stationary which was previously permitted to rotate and permit the other actuator unit disk which was held stationary to rotate; and means connected to said actuator unit disks for shifting one of the same relative to the other to effect the initial spreading action aforesaid and maintain frictional engagement of the actuator unit disks with the rotary disks while the latter cause further spreading of the actuator unit disks in brake application.

10. Brake mechanism as set forth in claim 3, wherein the rotary disks are duplicates of each other, and the actuator disks are also duplicates of each other but mounted in reverse position relative to each other.

DENT PARRETT.